Aug. 14, 1951  R. M. BRINK  2,563,814
VARIATION DETECTION
Filed April 29, 1948  3 Sheets-Sheet 1
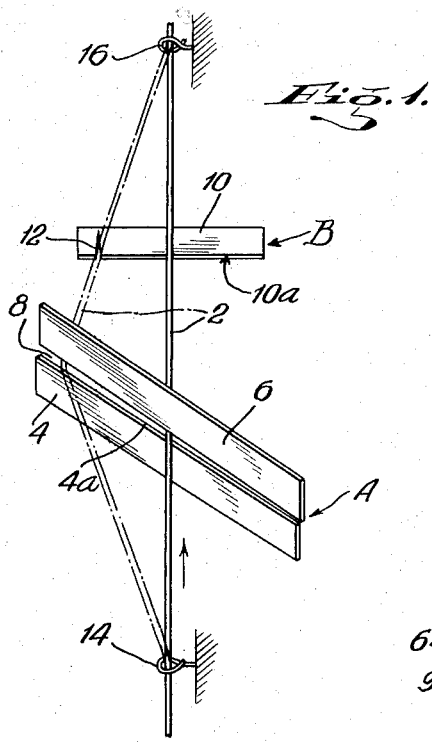
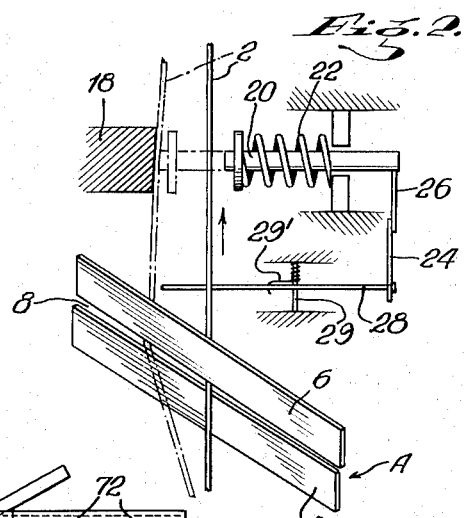
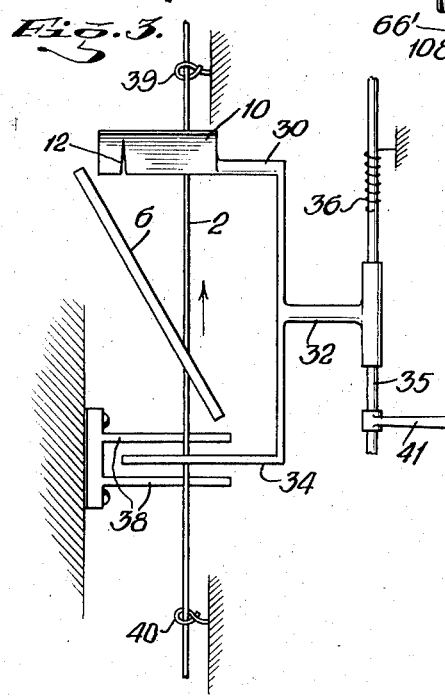
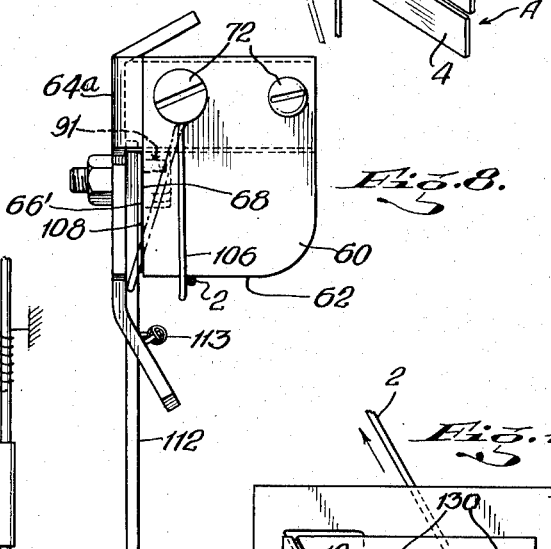
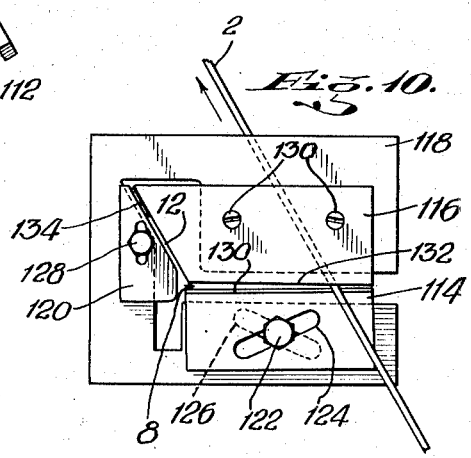
INVENTOR
ROBERT M. BRINK
BY
ATTORNEY Aug. 14, 1951  R. M. BRINK  2,563,814
VARIATION DETECTION
Filed April 29, 1948  3 Sheets-Sheet 2
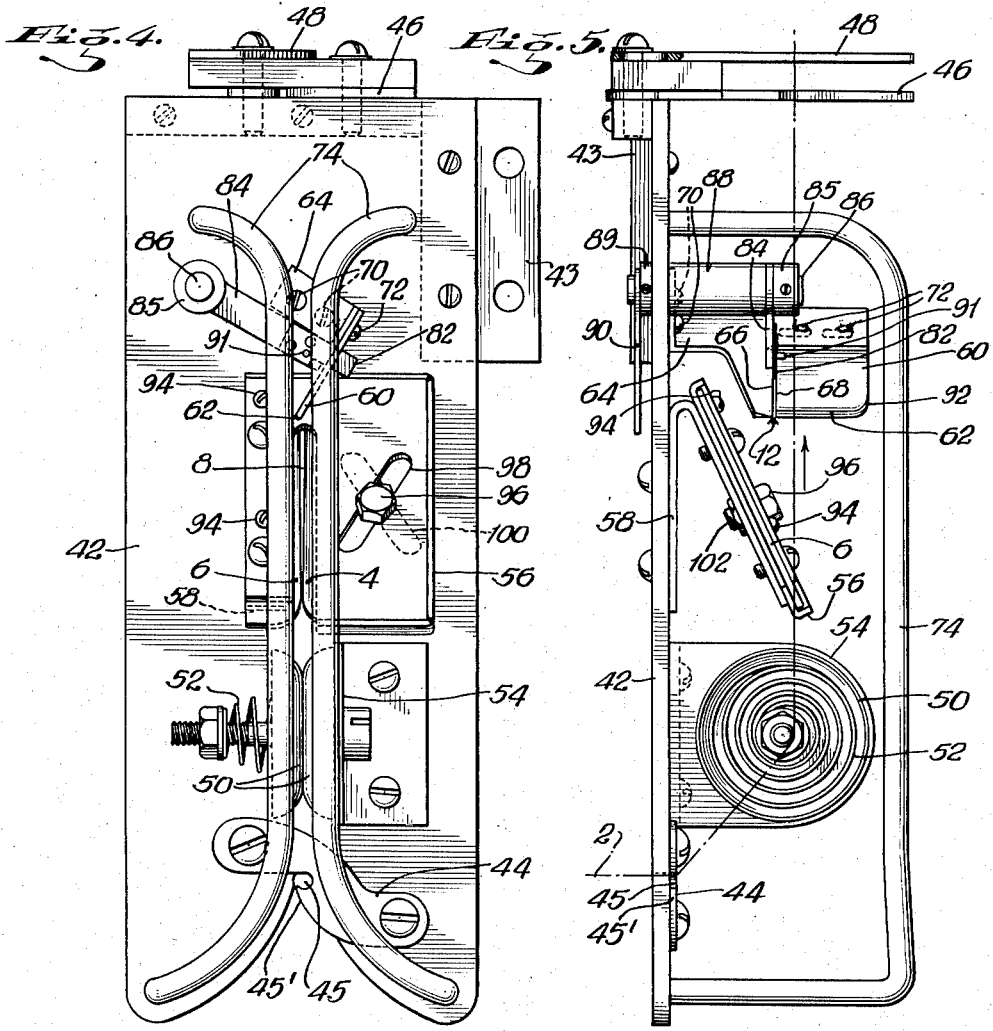
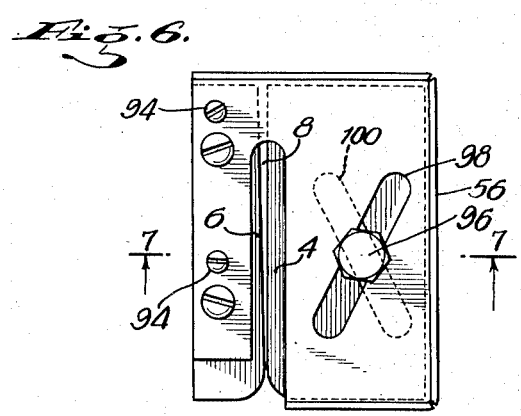
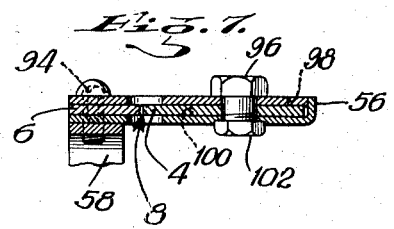
INVENTOR
ROBERT M. BRINK
BY
ATTORNEY

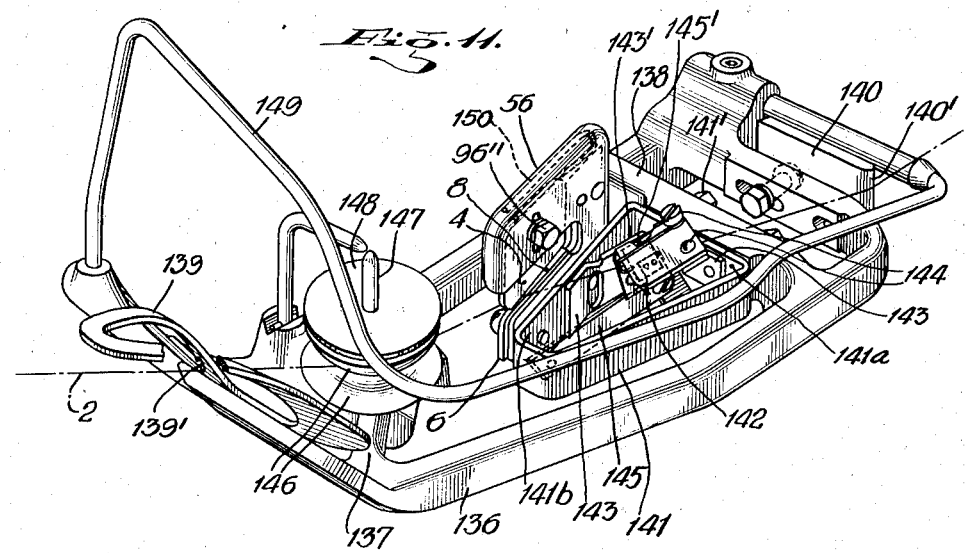
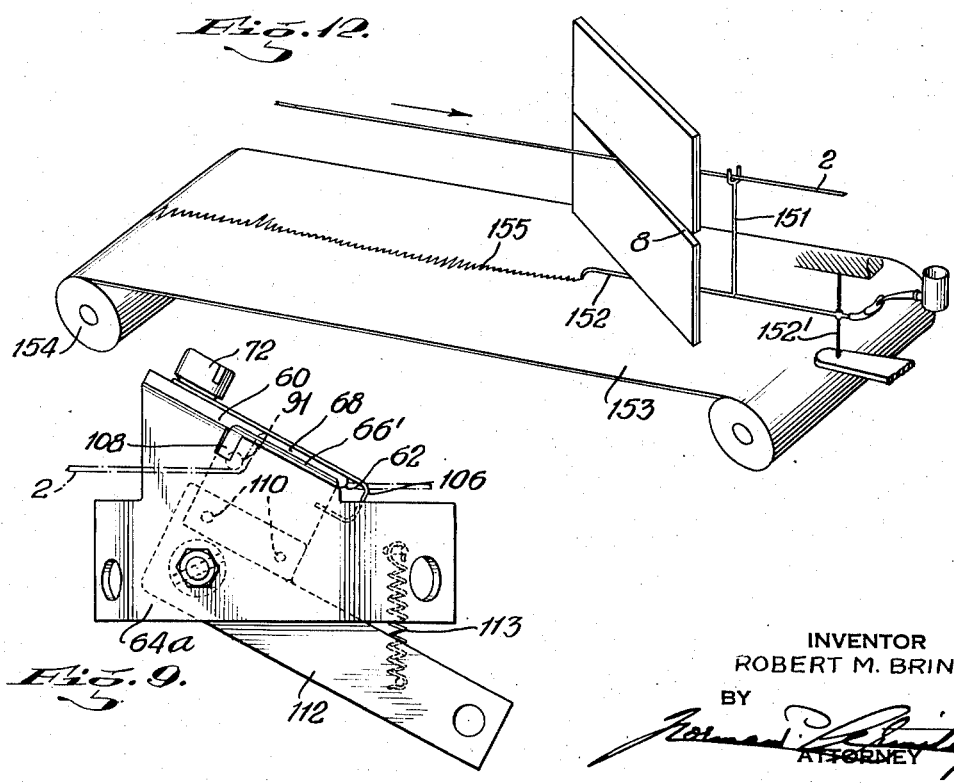

Patented Aug. 14, 1951

2,563,814

UNITED STATES PATENT OFFICE 2,563,814

VARIATION DETECTION

Robert M. Brink, Pelham, N. Y., assignor to Deering Milliken Research Trust, New York, N. Y., a nonprofit trust of New York Application April 29, 1948, Serial No. 24,077

10 Claims. (Cl. 28—64)

The present invention relates primarily to the textile art and more particularly to the manufacture of textile filamentary material and comprises a novel method of, and means for, detecting and signalizing variations in diameter of yarn or of other textile filamentary material. The invention is particularly suitable for use in the detection and elimination of sections of yarn of excessive diameter, known in the art as "slubs." It may be advantageously employed, however, for other purposes, as, for example, for the detection and recording of diametral variations of filamentary material or for actuation of control devices for regulation of yarn diameter during spinning.

The diameter-sensitive device of the invention, irrespective of its particular application, is adapted to deflect the path of travel of filamentary material in accordance with variations in its diameter. In preferred embodiments of the invention, this deflection is accomplished by passing the yarn or other filamentary material through a tapered slit disposed at an angle acute to the normal path of travel of the material with the narrow end of the slit nearer the source of the material. The inner surfaces of the slit thereby provide a component of force tending to deflect the filamentary material toward the wide end of the slit when the diameter of the material increases.

In the preferred embodiment of the invention the deflecting means is associated with means for arresting the travel of the material upon a predetermined deflection of the path to form a slub catcher of simple construction and of efficient operation. In another embodiment of the invention the deflecting means is combined with means for continuously measuring and recording the deflection of the path of the material, thus providing a simple mechanically operating diameter meter and recorder.

For a better understanding of the invention reference may be had to the accompanying drawings in which:

Figs. 1 and 2 are diagrams illustrating the principle of operation of a slub catcher embodying the invention and showing alternative types of yarn holding or cutting means;

Fig. 3 is a diagram illustrating the invention as embodied in a slub catcher equipped with a stop motion feeler for an associated winding mechanism;

Fig. 4 is a plan view of a slub catcher embodying the invention and representing a preferred embodiment thereof;

Fig. 5 is a side elevation of the slub catcher of Fig. 4, as viewed from the left of Fig. 4;

Fig. 6 is a view on an enlarged scale, of the deflecting member of the device of Figs. 4 and 5;

Fig. 7 is a section on the line 7—7 of Fig. 6;

Fig. 8 is a view on an enlarged scale of a modified construction of holding member suitable for use in the device of Figs. 4 and 5;

Fig. 9 is a side elevation of the holding member of Fig. 8, the view being taken from the left of Fig. 8;

Fig. 10 is a plan view of a combined deflecting and holding member suitable for use in a slub catcher of the general type of Figs. 4 and 5;

Fig. 11 is a perspective view of a slub catcher representing another embodiment of the invention; and Fig. 12 is a diagrammatic representation of a yarn diameter meter and recorder embodying the invention.

The new slub catcher of the invention and its principle of operation will first be described with reference to the diagrams of Figs. 1 and 2.

Fig. 1 shows the essential elements of the slub catchers of Figs. 3, 4, 5 and 11. These elements comprise yarn deflecting means, indicated at A, and yarn holding means, indicated at B. These elements, A and B, are located relatively close together along the path of travel of the yarn 2; the yarn being drawn under tension in the direction of the arrow by any suitable means (not shown).

The deflecting means A comprises a pair of fixed, substantially non-resilient elements 4 and 6 which are so spaced as to provide a tapered opening or slit 8 therebetween. The yarn 2 travels through the slit 8 between the elements 4 and 6, and these elements are positioned, as shown in Fig. 1, at an angle acute to the normal path of the yarn with the narrow end of the slit 8 nearer the source of the yarn and the wide end of the slit nearer the holding means B. The holding means comprises a member 10 having a wedge shaped slot 12 therein which is spaced to one side of the normal path of travel of the yarn. The slot 12 tapers from a relatively wide mouth at the edge 10a of the member 10 to a width less than the diameter of the yarn with which the device is to be used. The member 10 is positioned with its edge 10a transverse to the normal yarn path and adjacent thereto so that the yarn engages and rides over the edge 10a, the edge 10a being rounded to avoid roughening of the yarn in its passage thereover. The edge 10a and the edge 4a of element 4 forming one side of the tapered slit 8 are in substantially the same plane. The member 10 is preferably inclined at a small angle to this plane to present the edge 10a to the advancing yarn and to cause the slot 12 to taper in the general direction of yarn travel.

It will be understood that the yarn 2, in its travel to and from the above described elements, will pass through suitable guide or tensioning means which determine the normal path of travel of the yarn. Such means are diagrammatically indicated in Fig. 1 as conventional yarn guides 14 and 16. To insure continuous contact of the yarn with edge 10a of the holding means, the guide 16 is preferably positioned to deflect the yarn slightly from the plane containing the edges 10a and 4a, the direction of this deflection of the yarn path being, as viewed in Fig. 1, toward a point beneath the plane of the paper.

In the use of the device diagrammatically illustrated in Fig. 1, the spacing between the elements 4 and 6 is first adjusted with reference to the average diameter of the yarn to be handled and with reference to the diameter of slub to be detected. The narrow portion of the slit 8, in which the yarn normally travels, should be wide enough to permit yarn of the desired diameter to pass therethrough. The part of the slit 8 which is at substantially the same lateral distance as the wedge shaped slot 12 of the holding element from the normal yarn path should have a width substantially equal to the diameter of the minimum slub to be caught. Any suitable means, as for example those hereinafter described in connection with Figs. 6, 7, 10 and 11 may be employed for so adjusting the width and taper of the slit 8.

The manner in which slubs are detected and caught by a device having the elements diagrammatically illustrated at A and B in Fig. 1 will now be described. The yarn 2 normally travels, as shown in solid lines, through a relatively narrow part of the slit 8 and over the edge 10a at a location relatively remote from the slot 12. When the diameter of the yarn exceeds the width of the slit 8 at the normal point of travel, the angular disposition of the elements 4 and 6 with reference to the yarn path provides a component of force tending to deflect the yarn toward the wider part of the slit 8. The greater the increase in diameter of the yarn, the greater will be the deflection of the yarn path. When the diameter of the yarn increases sufficiently to deflect the path of the yarn to the position illustrated in dotted lines in Fig. 1, the yarn rides into the slot 12, and is jammed and held therein, with consequent breakage at that point of travel. Thus, while yarn is travelling through the deflecting means, its path through the deflecting means automatically shifts with change in diameter and, by slight rounding of the edges defining the slit 8, undue roughening of the yarn surface is avoided.

Fig. 2 illustrates, diagrammatically, a type of yarn holding or cutting means that could be substituted for the type of holding means diagrammatically shown in Fig. 1.

In Fig. 2 the yarn, after leaving the deflecting member, passes between a fixed stop 18 and a hammer 20. The hammer 20 is biased by a spring 22 toward engagement with the stop 18 but is normally held in retracted position by a detent 24 engaging a finger 26 on the hammer. Detent 24 is carried on one end of a pivoted lever 28, the other end of which is positioned beneath the normal path of the yarn 2. When the yarn is deflected by a slub passing through the deflecting means, the yarn slides off the end of lever 28, permitting the lever to turn about its pivot 29 under the influence of a coiled spring 29' and move the detent 24 out of the path of finger 26. The spring 22 thereupon forces the hammer 20 into the dotted line position of Fig. 2 in which the yarn is gripped firmly between the hammer 20 and the stop 18.

In Fig. 3, yarn holding means of the type of Fig. 1 is shown associated with a conventional stop motion feeler for a spooling mechanism. In this embodiment of the invention the member 10 is carried by, or made integral with, one arm 30 of a bifurcated member 32, the other arm 34 of which serves as a feeler to detect breakage of yarn. Member 32 is mounted on a rod 35 which, when rotated about its axis, effects stoppage of the winding mechanism in a manner known in the art. The yarn 2, passing under the feeler arm 34, opposes the tension of a coiled spring 36 tending to rotate the rod 35 in a direction to stop the spooling mechanism. The spooler and control mechanism thereof associated with the rod 35 have not been illustrated in the drawing as they are conventional parts of a machine now in wide commercial use and well known in the art. Feeler arm 34, which engages the yarn 2 intermediate its passage over spaced fixed rods 38, conveniently serves, with the rods 38, as a tension device as well as a stop motion feeler arm. The deflecting member, of which but one edge of element 6 is visible in the drawing, is positioned in advance of the holding means 10 and at an angle to the yarn path as heretofore described in connection with Fig. 1, the wider end of the tapered slit being nearer the holding means. The member 10, also as described in connection with Fig. 1, is so oriented as to insure that the yarn will ride up in the slot 12 when a slub in the yarn causes the deflecting means to deflect the yarn path. Suitable fixed guide means for the yarn 2 are indicated at 39 and 40.

The above described device is readily threaded when the arms 30 and 34 are swung out of yarn engaging position by rotation of the rod 35. In Fig. 3 an operating arm 41 is indicated for manually rotating the rod 35. In an automatic spooler such rotation of the rod 35 is effected automatically during knotting of ends. Preferably, the surface of the deflecting members is shaped to facilitate entrance of the yarn into the narrow end of the slit 8 during the threading operation, as will be well understood by those skilled in the art.

The operation of the slub catcher of Fig. 3 will be clear from the description given in connection with Fig. 1. As the diameter of the yarn varies, its path through the tapered slit of the deflecting means will vary. When the diameter of the yarn is large enough to deflect the yarn into the slot 12, the yarn is held thereby and breaks. Breakage of the yarn removes the restraint on the feeler acting in opposition to the spring 36 and thus permits rotation of rod 35 in a direction to stop the take-up of yarn by the spooler.

Figs. 4 and 5, to which reference may now be had, illustrate a slub catcher embodying the elements of Fig. 1 and constructed to provide ease of threading and automatic clearance of fly or lint from the holding means.

The device of Figs. 4 and 5 includes a base plate or frame 42 upon which the various parts of the device are mounted. A bracket 43, secured to the frame 42, provides means for mounting the device on a spooler or other mechanism with which the device is to be used. The frame 42 is substantially rectangular in shape but is cut away medially at the yarn receiving end as shown in Fig. 4. A plate 44, which is mounted on the frame 42 adjacent the yarn receiving end, has an arcuate recess 45 therein for passage of yarn therethrough and a rounded surface 45' for guiding the yarn into the recess 45 during threading of the device. A pair of upright members 46 and 48, having cooperating contours, are mounted on the yarn delivery end of the frame 42 to provide a guide for yarn at exit from the device. A tension device, comprising conventional bell washers 50, urged into engagement by a spring 52, is mounted on a bracket 54 carried by the frame 42. The washers 50 of the tension device are suitably oriented, as shown, in the path of flow of the yarn from the guide passage 45 to the guide means 46 and 48. The deflecting means comprises, as in Figs. 1, 2 and 3, the elements 4 and 6 defining the tapered slit 8. These elements 4 and 6 are carried in a casing 56 which permits of adjustment of the width and taper of the slit as hereinafter described in connection with Figs. 6 and 7. The casing 56 is mounted at an angle to the base plate 42 by means of a V-shaped bracket 58, one leg of which is secured flush with the plate and the other leg of which provides an inclined support for the casing. The casing is so orientated on the leg of the bracket 58 that the medial line of the slit 8 is disposed in a plane normal to the surface of the plate, with the narrow end of the slit remote from the plate so that, with increasing yarn diameter, the path of the yarn is deflected toward the plate. The distance of the normal path of the yarn from the plate is determined by the guide members 46 and 48 and these members are therefore preferably mounted to permit of adjustment of the normal position of the yarn in the slit 8.

The holding means of the device of Figs. 4 and 5 is of the type described in connection with Figs. 1 and 3. It comprises a plate 60 having a rounded edge 62 substantially normal to the base plate 42, and a supporting bracket 64 therefor having an edge 66 adjacent an edge 68 of the plate 60 and defining therewith the slot 12 for catching and holding the yarn. Supporting bracket 64, is secured, as by screws 70 to the frame 42. The plate 60 is mounted on the bracket 64 by means of bolts 72 passing through aligned holes in the plate 60 and the bracket 64, the bolt holes in either the plate 60 or bracket 64 being preferably elongated or over sized to permit adjustment of the width of the slot 12. The plate 60, as shown in Fig. 4, is disposed at an angle of about 30° to a plane perpendicular to the plate 42 and passing through the slit 8 of the deflecting means and between the bell washers 50 of the tension device. The plate 60 cuts this plane so that the edge 62, which is substantially parallel to this plane is slightly to one side thereof and is thus insured of engagement by the yarn during passage to the guide means 46—48.

To facilitate threading of the above described device, a pair of rails 74, of round stock or the like, are secured at their ends, as by welding, to the base 42. These rails 74, for the major part of their length, are substantially parallel and relatively closely disposed on opposite sides of the medial plane passing between the washers 50 and through the tapered slit 8, the parallel stretches of the rails being spaced from the base 42 so as to clear the tension device, deflecting means and yarn holding means. Beyond their parallel stretches, the rails 74 diverge, as shown, and terminate in legs substantially perpendicular to the frame 42.

To avoid accumulation of fly or lint in the slot 12 of the yarn holding device, a clearer blade 82 is provided. The blade is mounted on the end of an arm 84 and extends into the slot 12. Arm 84 is secured at its other end to a collar 85 fixed to a shaft 86. Shaft 86 is rotatably mounted in a sleeve 88 carried by the frame 42. Shaft 86 extends through a suitable aperture in the base 42 and carries a collar 89 at its outer end to which is secured an operating arm 90. Arm 90 may be manually operated to cause the blade 82 to reciprocate in the slot 12 for removal of fly or lint, but preferably is connected by suitable linkage (not shown) to the reset or start mechanism of the spooler or other take-up device with which the slub catcher is associated. With such arrangement, the blade 82 is reciprocated to clear the slot 12 after each yarn breakage occasioned by a slub in the yarn.

A pin 91 is mounted on the blade 82 in a position to be engaged by the yarn when, and only when, the yarn rides up in the slot 12. The pin facilitates breakage of the yarn in the slot as it tends abruptly to increase to substantially 90° the angle which the part of the yarn in the slot makes with the slot.

The operation of the device of Figs. 4 and 5, being the same as that described with reference to Figs. 1 and 3, needs no further description. After each breakage of the yarn the device is rapidly threaded by a simple drawing of the yarn into the opening between the rails 74 and through the guides 46 and 48. Upon application of tension, the yarn rides into the guide passage 45, passes between the washers 50 of the tension device, passes into the slit 8 between the parts 4 and 6 of the deflecting members and rides over the edge 62 of the holding means, plate 60 being suitably rounded, as shown at 92 in Fig. 5, to guide the yarn to its normal path.

As heretofore indicated, the deflecting means of the device is preferably constructed to permit of ready adjustment of the spacing between the parts 4 and 6 so that yarn of different average diameter may be handled. One suitable arrangement for so adjusting the spacing between the parts 4 and 6 is shown in Figs. 6 and 7 to which reference may now be had.

In the construction of the deflecting means shown in Fig. 6, the element 6 is affixed to the casing 56 by screws 94 while the part 4 is mounted for adjustment toward and away from the element 6 by means of a bolt 96 which passes through relatively inclined elongated slots 98 and 100 in the casing 56 and member 4 respectively. One face of the casing is suitably recessed adjacent to the slot 98 for reception of a nut 102 for the bolt 96. With this construction when tension between parts is relieved by turning of the bolt 96 in the nut 102, member 4 may be moved relative to strip 6 by movement of the bolt 96 in the cooperating slots as will be apparent to those skilled in the art. Under these conditions, adjustment of the width of the opening 8 and of the taper thereof may be effected by sliding a tapered gauge between the parts 4 and 6 and then moving the part 4 into engagement with the gauge and tightening the bolt to hold the parts against relative movement after withdrawal of the gauge. The casing 56 is cut away on both faces for the effective length of the slit 8 to permit uninterrupted travel through the slit and also ready removal of the tapered gauge.

Other constructions permitting adjustment of the width and taper of the slit 8 will occur to those skilled in the art. For example one of the elements 4 and 6 could be magnetized to attract the other or spring means, as shown in Fig. 11 and hereinafter described, could be provided for urging the elements toward each other.

By adjustment of the dimensions of the tapered slit 8, and of the width of the slot 12 of the holding means, a slub catcher, such as that of Figs. 4 and 5 can be made so sensitive that substantially all over sized sections of the yarn, irrespective of length, will be detected. In the case of some yarns, it is preferable, from the point of view of economy of time of mill personnel, that very short lengths of over size yarn, such as neps, be not eliminated during the winding operation, as these defects can be readily removed after the yarn is woven into fabric. By the addition of an inertia member to the holding means, a slub catcher such as that of Figs. 4 and 5 can be readily modified to permit neps in the yarn to pass through the device without being caught. Such modified construction of holding member is shown in Figs. 8 and 9 to which reference may now be had. The inertia member comprises a wire 106 which is pendulously supported from the shoulder of one of the support screws 12 and extends beyond the edge 62 of the plate 60 so as to be engaged by the yarn upon deflection from its normal path. The wire 106 is bent through two right angles at its end, as shown in Fig. 9, to prevent the wire from bouncing away from the plate 60 and over the yarn. When the yarn path is deflected, the wire 106 is urged by the yarn in a clockwise direction, as viewed in Fig. 8 and, when the yarn enters the yarn holding slot, assumes the position shown in dotted lines. The wire 106, which may be piano wire, has a small but definite weight. Hence when the path of the yarn is deflected in the slit 8 of the deflecting means, the deflection of the yarn path along the edge 62 of the plate 60 will vary inversely with the mass of the wire 106 and directly with the deflecting force and with the square of the time through which such force acts. By suitable selection of the weight of wire 106 with reference to the rate of yarn travel, the deflection of the yarn along the edge 62 resulting from neps or very short slubs can be kept small enough to avoid catching and consequent breakage.

In the particular construction of holding member shown in Figs. 8 and 9 the need for adjustment of the width of the yarn holding slot is obviated as is also the need for a separate clearer blade. A sheet 108 of spring metal, is secured, as by rivets 110 to an arm 112 pivotally mounted on the supporting bracket 64a. In the normal position of arm 112, one edge 66' of the sheet 108 yieldingly engages the edge 68 of the plate 60. A coiled spring 113, one end of which is secured to the arm 112 and the other end of which is secured to the bracket 64a biases the arm 112 against rotation on its pivot. The pin 91 for faciliating breaking of the yarn is mounted on the spring 103. When the yarn path is deflected upon occurrence of a slub, the yarn engages the sheet 108, rides up between the edges 66' and 68, engages the pin 91 as shown in dotted lines in Fig. 9, and breaks under the continuing tension of the associated take-up mechanism. As the spring sheet 108 and the edge 68 thus form, in effect, a self-adjusting slit, no separate means for adjusting the width thereof is required. The arm 112, by suitable connection to the restart mechanism of the winder, or by hand, may be rocked on its pivot against the bias of the spring 113 after each slub is caught to clear the device of lint.

The deflecting means and yarn holding means of the slub catcher of Figs. 1 and 4 can be conveniently combined in a single structure as shown in Fig. 10. In this embodiment of the invention the slit 8 is formed between two elements 114 and 116 which are mounted on a yoke 118 and the slot 12 is formed between one edge of the element 116 and an edge of a third part 120 also mounted on the yoke 118. The element 114 is preferably adjustably mounted on the yoke 118 so as to permit of adjustment of the dimensions of the slit 8 for accommodation of yarns of different average diameter. In the particular embodiment of the invention illustrated in Fig. 10, the mounting of the element 114 on yoke 118 is of the type of that of Fig. 6.

A bolt 122 passes through angularly disposed slots 124 and 126 in the element and yoke, respectively, and is threaded into a suitable nut (not shown) for holding the parts in adjusted position. Part 120 is mounted on the yoke 118 by means of a bolt 128 which passes through aligned holes in the part and in the yoke and is provided with a suitable nut (not shown). Preferably the bolt hole in part 120 is made over size to permit adjustment of the width of slot 12. Element 116 is fixedly secured to the yoke 118 as by screws 130.

The elements 116 and 120 are so shaped that the slot 12 extends from the wider end of the slit 8 and forms an angle of about 150° therewith. The angular disposition of the entire structure with relation to the normal path of travel of the yarn is a composite of the angular dispositions of the separate deflecting and holding means of Fig. 1. The orientation of the structure may be considered as the result of two successive rotations each of about 60°, from a position in which the face of the structure is in a plane perpendicular to the yarn path. The first such rotation is about an axis in such plane and generally perpendicular to the slit 8, the rotation being in a direction to bring the narrow end of slit 8 toward the source of the yarn. The second rotation is about an axis in the rotated plane and generally parallel to the slit 8, the direction of rotation being clockwise as viewed from the right of Fig. 10. Preferably to permit the yarn 2 to pass through the slit 8 without abrupt bending at the sides of the slit 8, the cooperating edges 130 and 132 of the elements 114 and 116, respectively, which define the slit 8, are cut at angles to the faces of the elements so as to form plane surfaces parallel to the yarn path.

The above described composite yarn deflecting and holding means of Fig. 10 may be substituted in the device of Figs. 4 and 5 for the separate deflecting and holding means of that construction or could be mounted between any suitable guide or tensioning means to provide a simple and efficient slub catcher. The operation of the device is essentially the same as already described in connection with Figs. 1, 3, 4 and 5. The yarn moves back and forth in the tapered slit 8 in accordance with changes in diameter. When the deflection of the yarn path is such as to bring the yarn to the mouth of slot 12, the yarn rides up into that slot and is held therein. If desired a clearer blade like the blade 82 of Figs. 4 and 5 could be provided for the slot 12 of the composite structure of Fig. 10, as indicated at 134, and any suitable means could be provided, either automatically or manually operated, for reciprocation of the blade in the slot.

In Fig. 11, to which reference may now be had, the invention is illustrated in a slub catcher essentially like that of Figs. 4 and 5 but of a somewhat different construction. The device of Fig. 11 includes an open framework 136 having two cross pieces 137 and 138 which may be formed integrally therewith and which provide support for the tensioning, deflecting, and yarn holding members as hereinafter described. A yarn guide 139, recessed at 139' for passage of the yarn therethrough, is secured to the forward end of the frame 136 and a plate 140, one end 140' of which is rounded, is adjustably secured to the rearward end of the frame 136. The position of the plate 140 determines the normal yarn path as it serves as a guide for the yarn at exit from the device. A bracket 141, comprising a strip bent into the form of a truncated isosceles triangle of relatively short base and welded at its ends, is mounted on the cross piece 138 of the frame by means of screw bolts 141' which pass through holes in the cross piece and thread into the leg 141a of the bracket corresponding to the base of the triangle. The casing 56 enclosing the strips 4 and 6 of the deflecting means is secured to a leg 141b of the bracket 141 so as to position the slit 8 at an acute angle to the path of the yarn 2. The yarn holding means comprises a plate 142, under the forward edge of which the yarn 2 normally rides, and a support member 143 to which the plate 142 is secured, as by screws 144. Member 143 is welded, or otherwise fixedly secured to the legs 141a and 141b of the bracket 141 and has an edge 143' which, together with the adjacent edge of plate 142 defines the yarn holding slot 12. Pivotally mounted on the support 143 below the plate 142 is a bell crank lever 145, one arm of which carries a clearer blade 145' which extends into the slot 12 and the other arm of which extends below the frame 136 for convenient connection to the reset mechanism of the winder or spooler with which the slub catcher is to be used. Preferably, spring means, not visible in the view shown in Fig. 11, is provided for biasing the blade toward the rear of the slot 12.

Mounted on the crosspiece 137 in advance of the deflecting means, is a tension device comprising conventional bell washers 146 concentrically mounted on a post 147 and biased into engagement by a weighted disk 148. A guide rail 149 extending upwardly from the forward corner of the frame 136 adjacent the guide eyelet of the guide 139, then sloping downwardly across the frame, rearwardly above one side of the frame for the length thereof and then transversely of the frame in the rear of the guide 140, facilitates the threading of the device by guiding the yarn to its normal path through the tension device and slit 8 of the deflecting means and under the forward edge of the plate 142 of the holding device.

In the particular embodiment of the invention illustrated in Fig. 11, the strip 4 of the deflecting means is biased toward the fixed strip 6 by means of a spring member 150 within the casing 56. A bolt 96", passing through elongated slots in the casing 56 and a hole in the strip 4 and provided with a suitable lock nut, not visible in the view shown in Fig. 11, serves to lock the member 4 against movement toward or from the strip 6. When adjusting the width and taper of the slit 8, a tapered wedge is forced into the slit when the bolt 96" has been turned to release the strip 4. The bolt is then tightened and the gauge withdrawn.

The operation of the slub catcher of Fig. 11 is like that of the slub catcher of Figs. 4 and 5, and hence will be clear without further description.

In Fig. 12 the deflecting means of the invention is diagrammatically shown as incorporated in a yarn diameter meter and recorder. In this embodiment of the invention a feeler 151, engaging the yarn 2 adjacent the slit 8, is secured to a pivotally mounted pen 152 so as to cause the pen to be moved about its pivot 152' in accordance with the deflection of the yarn path. The pen 152 is positioned over a sheet 153 which is continuously moved under the pen as by rotation of a take-up drum 154. Preferably, as shown, the feeler 151 is connected to the pen 152 adjacent the pivot 152' in order to obtain an amplified record of the yarn path deflection.

The record traced by the pen, indicated by the line 155, is thus a record of yarn diameter variations. By the provision of a suitably calibrated scale transversely of the sheet (not shown) the magnitudes of the diameter variations may be determined and by provision of a suitable scale longitudinally of the sheet (not shown) the length of yarn of any particular diameter variation may be determined for any particular rate of travel of the yarn and of the sheet.

The invention has now been described with reference to various embodiments thereof. In each embodiment of the invention the path of travel of filamentary material is deflected in accordance with variations in the diameter of the material, and such deflections are utilized to signify diameter changes. In each embodiment of the invention, the deflecting means is a fixed element so formed and so positioned relative to the flow path of the material as to utilize the tension in the moving material to create a component of force normal to the flow path. In each embodiment of the invention, means are provided for signifying deflections of the yarn path, either all deflections as in the meter of Fig. 12, or excessive deflections only, as in the slub catchers of the invention. Alternative signifying means for use in slub catchers having the fixed deflecting means of the invention have been described.

The following is claimed:

1. A device for detecting slubs in filamentary material comprising in combination fixed means positioned in the path of travel of the material and adapted to cause deflections of the path of the material upon occurrence of slubs therein, the magnitudes of the deflections varying in accordance with the diameter of the slubs, and means associated with said fixed means for arresting the travel of the material upon a predetermined deflection of its path, said first mentioned means comprising a member providing a tapered slit for passage of material therethrough, said member being so positioned relative to the path of the material that the slit is inclined at an acute angle to the path and increases in width in the general direction of travel of the material and said last mentioned means comprising a member having a smooth straight edge positioned transverse to the path of the material for passage of material thereover and a slot in said edge positioned for entrance of material therein upon the predetermined deflection of the path, said last mentioned member being so positioned as to present said edge to material passing through the tapered slit.

2. A slub catcher for yarn comprising in combination means fixedly positioned in the path of travel of the yarn and adapted to cause deflection of the path of the yarn upon occurrence of a slub therein, and yarn arresting means associated with said deflecting means comprising members having two straight edges meeting substantially perpendicularly, one of said edges being rounded and positioned transverse to the path of flow of the yarn for passage of the yarn thereover, and a cooperating member resiliently engaging the other of said edges for reception and arrest of yarn therebetween when said deflecting means deflects the path of the yarn along said rounded edge and to the extremity thereof.

3. The slub catcher according to claim 2 including means for moving said cooperating member along the edge of the other member engaged thereby, whereby the device may be cleared of lint or the like after arrest of yarn.

4. The slub catcher according to claim 2 including an element positioned to be engaged by the part of the yarn beyond the resiliently engaged edge of the first mentioned member when the yarn is between said edge and the cooperating member for facilitating arrest of the yarn by abruptly increasing to substantially 90° the angle at which the yarn passes said resiliently engaged edge of the first mentioned member.

5. A device for detecting slubs in travelling filamentary material comprising a pair of elements having cooperating edges defining therebetween a tapered slit angularly disposed across the path of travel of the material, the minimum width of the slit corresponding to the average diameter of the material so as to cause the path of the travelling material to be deflected in accordance with increase in diameter of the material, means responsive to a predetermined deflection of the path of the material, corresponding to a slub of predetermined minimum diameter in the material, for signifying the presence of the slubs, said last mentioned means comprising a member having a slot normally out of the path of travel of the material and positioned for entry of the material therein when the deflection of the path is of the predetermined value, said slot being shaped and dimensioned to arrest the travel of material entering therein and an inertia member associated with said slotted member for preventing arrest of material when the duration of the force tending to deflect the path of the material is less than a predetermined value whereby the device discriminates between slubs of different lengths.

6. The device according to claim 5 wherein said inertia member comprises a pendulously supported element having a part interposed between the normal path of the material and said slot for movement by the material upon deflection of its path.

7. A slub catcher for yarn comprising a frame, yarn guide means mounted on said frame for passage of yarn therebetween, a member having an elongated tapered slit therein, said member being mounted on said frame between said guide means with the slit increasing in width in a direction making an acute angle with the direction of travel of the yarn, means for arresting the travel of the yarn when the yarn is deflected a predetermined distance toward the wider end of the slit, said member comprising two parts defining the tapered slit, and the frame and one of said parts being provided with cooperating angularly disposed slots and means extending through said angularly disposed slots for adjustably securing said part to the frame whereby the width and taper of said tapered slit may be varied.

8. A slub catcher for yarn comprising a frame, yarn guide means mounted on said frame for passage of yarn therebetween, a member having an elongated tapered slit therein, said member being mounted on said frame between said guide means with the slit increasing in width in a direction making an acute angle with the direction of travel of the yarn, means for arresting the travel of the yarn when the yarn is deflected a predetermined distance toward the wider end of the slit, said last mentioned means comprising a member having a slot positioned for entry of the yarn therein upon the predetermined deflection of the path, said slot extending in the general direction of travel of the yarn, and means for preventing accumulation of lint or the like in said slot.

9. A device of the character described comprising a structure for insertion in the path of travel of filamentary material, said structure having an elongated tapered slit therein for passage of the filamentary material therethrough and for deflection of the path thereof with increase in diameter and a slot for holding the material, said slot being angularly disposed with respect to said slit and communicating therewith at the wider end thereof, the orientation of said structure relative to the direction of travel of the material corresponding to the result of two successive rotations, each of about 60°, from an initial position wherein the imaginary plane defined by said tapered slit and said slot is perpendicular to the direction of travel of the material, the first of said rotations being about an axis in said plane substantially perpendicular to the tapered slit and the second of said rotations being about an axis in the rotated plane substantially parallel to one edge of said tapered slit, the direction of said rotations being such that in the final position the slit increases in width in a direction making an angle of about 30° with the direction of travel of the travelling material and the material holding slot extends from the tapered slit in a direction generally parallel to the normal path of travel of the material.

10. The device according to claim 9 wherein said structure comprises at least two parts, the spacing between which defines the tapered slit, and wherein means are provided for adjusting said spacing to vary the dimensions of said tapered slit.

ROBERT M. BRINK.

REFERENCES CITED

The following references are of record in the file of this patent:

UNITED STATES PATENTS

| Number | Name | Date |
|---|---|---|
| 1,817,937 | Taylor | Aug. 11, 1931 |
| 1,826,584 | Vilt | Oct. 6, 1931 |
| 2,434,091 | Arrington | Jan. 6, 1948 |